United States Patent [19]

Graetz

[11] Patent Number: 4,498,282
[45] Date of Patent: Feb. 12, 1985

[54] WIRE ROPE HAVING A DURABLE MARKER

[75] Inventor: Reinhard Graetz, Wiesbaden, Fed. Rep. of Germany

[73] Assignee: Hoechst Aktiengesellschaft, Frankfurt am Main, Fed. Rep. of Germany

[21] Appl. No.: 450,298

[22] Filed: Dec. 16, 1982

[30] Foreign Application Priority Data

Dec. 18, 1981 [DE] Fed. Rep. of Germany ... 8136921[U]

[51] Int. Cl.³ .................. B32B 1/00; B32B 15/00; D07B 1/06; D02G 3/00
[52] U.S. Cl. .................. 57/218; 57/212; 57/214; 428/377; 428/379; 73/768; 116/200; 116/208
[58] Field of Search ......... 428/373, 377, 379, 401, 428/187, 375; 57/210, 212, 213, 214, 218, 230, 231, 906, 232, 238; 73/768; 116/208, 212, 200

[56] References Cited

U.S. PATENT DOCUMENTS

| 1,635,750 | 7/1927 | Jenks . | |
| 1,752,497 | 4/1930 | Massingham | 156/53 |
| 1,762,918 | 6/1930 | Dodge . | |
| 2,031,267 | 2/1936 | Koon | 117/2 |
| 2,382,355 | 8/1945 | Warren | 22/31 |
| 2,399,157 | 4/1916 | Warren | 57/147 |
| 3,080,748 | 3/1963 | Barkley | 73/768 |
| 3,832,215 | 8/1974 | Franke, Jr. et al. | 156/48 X |
| 4,202,164 | 5/1980 | Simpson et al. | 57/232 |
| 4,275,768 | 6/1981 | Riggs et al. | 428/187 |
| 4,350,046 | 9/1982 | Parfree et al. | 73/768 |

FOREIGN PATENT DOCUMENTS

| 1059373 | 3/1954 | France | 116/212 |
| 146384 | 5/1921 | United Kingdom . | |
| 318588 | 6/1930 | United Kingdom . | |

Primary Examiner—Lorraine T. Kendell
Attorney, Agent, or Firm—Schwartz, Jeffery, Schwaab, Mack, Blumenthal & Koch

[57] ABSTRACT

Described is a novel marker for wire ropes, in the form of a polymer, e.g., polyester film carrying a highly abrasion-resistant impression. This polyester film is wound around a support element in spirally overlapping manner and is worked into a gap between the bundles of strands, at the same twisting angle as the latter.

8 Claims, 2 Drawing Figures

WIRE ROPE HAVING A DURABLE MARKER

BACKGROUND OF THE INVENTION

The present invention relates to a wire rope which comprises several strands twisted together around a fiber or steel rope core and which contains a durable marker.

It is difficult to distinguish qualitative characteristics of wire ropes, such as strength, metal composition, resistance to corrosion, etc., simply by the outward appearance of the ropes. Therefore, attempts have been made to mark the individual wire ropes according to the various technical applications for which they are intended. However, quite a number of problems have come up in trying to realize this aim.

For example, when ropes are guided over rollers, the individual strands are shifted relative to the core, whereby high specific pressures are observed. In general, the conventionally used markers are damaged or even destroyed by these mechanical stresses.

Furthermore, wire ropes are often treated with greases, lubricating agents or impregnating agents during use, and, of course, the markers must not be attacked by these substances. The lubricating and impregnating agents also cause the metal dust forming due to the mechanical stress to adhere. Consequently, the wire ropes turn black after a short time of use, and often the color of the marker is no longer recognizable. The steel dust in turn causes mechanical stresses which in many cases are not sustained by the conventional markers.

Under normal operating conditions, the wire ropes generally reach temperatures of about 100° C., but under extreme stresses, temperatures up to 200°–300° C. can occur. At these extremely high temperatures, conventionally used markers are frequently stained or charred.

SUMMARY OF THE INVENTION

It is, therefore, an object of the present invention to provide an improved wire rope having a marker. A specific object of the invention is to provide a wire rope having a marker which is durably resistant to mechanical stresses, chemical influences, including, e.g., seawater, and high temperatures.

In accomplishing the foregoing objects, there has been provided according to the present invention a wire rope having a durable marker comprising a rope core comprised of a plurality of strands; a plurality of strands twisted together around the rope core; and a durable marker comprising a tape carrying marking information, the tape being worked into the strands of the wire rope in the direction of the longitudinal axis. Preferably, the tape is wound around a support element in spirally overlapping manner and is located between individual bundles of strands so as to be worked into the wire rope at the same twisting angle as the strands.

Further objects, features and advantages of the present invention will become apparent from the detailed description of preferred embodiments which follows.

DETAILED DESCRIPTION OF PREFERRED EMBODIMENTS

The marker incorporated in the wire rope of the present invention is a plastic tape having a width of from about 2 to 6 mm, preferably of from about 3 to 4 mm and a thickness of from about 10 to 100 $\mu$m, preferably of from about 50 to 100 $\mu$m. This plastic tape is wound around a support element in a spirally overlapping manner. Thus, improved strength values are obtained.

The plastic tape preferably is made of a stretch-oriented polyethylene terephthalate film, but it is also possible to use a polyamide, a polyolefin or a polyurethane film for its production. Stretching can be carried out monoaxially or biaxially. The film has been provided with an impression containing all necessary information. The abrasion and shear strength of this impression is higher than about 0.5 N/15 mm of film width. When a strip of a conventional adhesive tape is pressed onto the imprinted area and quickly yanked off again, the impression must not be destroyed.

The materials used for the support element preferably are glass fibers or metal wire. However, fibers of polyester, polyimide, carbon or combinations of these materials can also be employed. The support element has a diameter of from 100 to 200 $\mu$m, its minimum tear resistance is about 400 N/mm$^2$.

In further embodiments, the marker comprising a plastic tape and a support element may additionally be provided with a lacquer or metal coating. The marker is located in one of the longitudinally extending gaps between the individual bundles of strands, and is worked into the wire rope at the same twisting angle as the strands.

Wire ropes suitable for use in the present invention are in general comprised of a plurality of strands which are twisted together, each strand being composed of a number of concentrical layers of single wires which are also twisted together. In particular, the wire ropes comprise a very rigid core made of steel wires possessing a high tensile strength. This core is surrounded by a plurality of strands, the wires of which have a lower tensile strength, but a greater flexibility than the wires of the core.

The tensile strength of the core should in general amount to at least half the value measured for the entire rope, and preferably it should amount to between 60 to 75% of the tensile strength of the entire rope.

The wire rope of this invention has the advantage that, under normal operating conditions, the information contained on the plastic tape, such as, e.g., date of production, qualitative characteristics, and possible technical applications, is visible and clearly recognizable even after a long period of use. In addition, the mutual shifting of the strands is facilitated by the marker of plastic material, due to which the elasticity and resistance to corrosion of the wire rope are improved.

The invention is illustrated in detail by the attached drawings.

Figure 1:
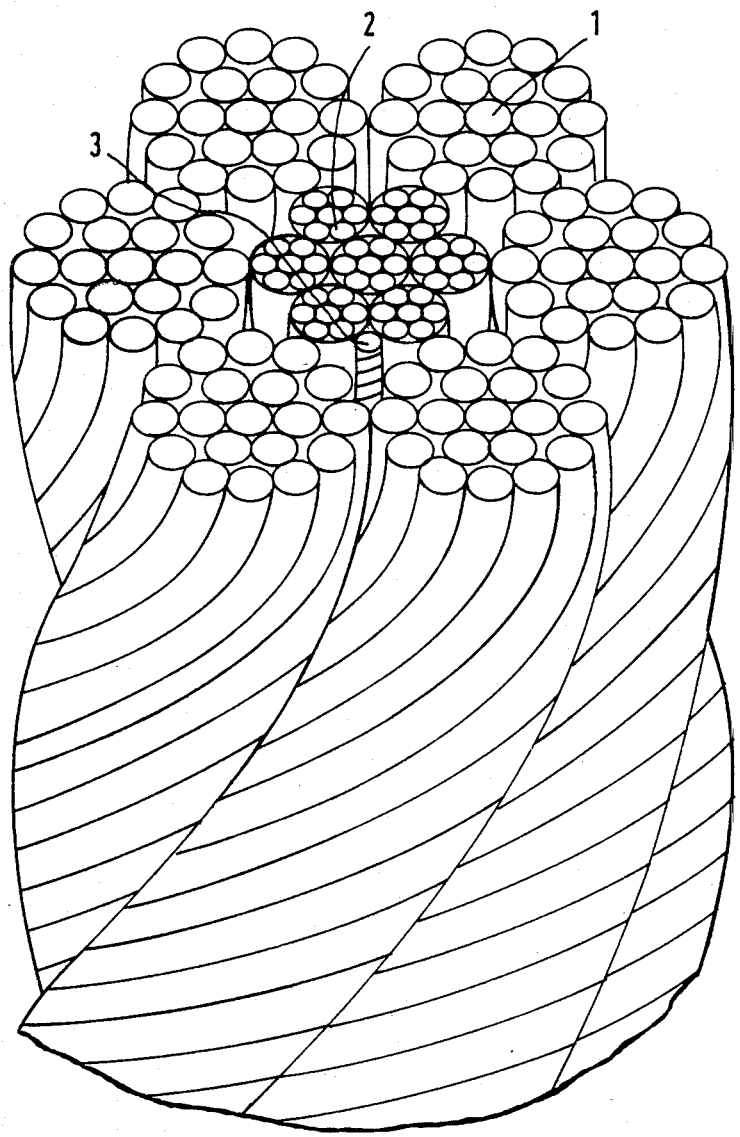
FIG. 1 is a perspective, cross-sectional view of a wire rope according to the present invention.

FIG. 1 shows a perspective, cross-sectional view of the wire rope of this invention, wherein 1 denotes a strand, 2 denotes the steel core and 3 denotes the marker.

Figure 2:
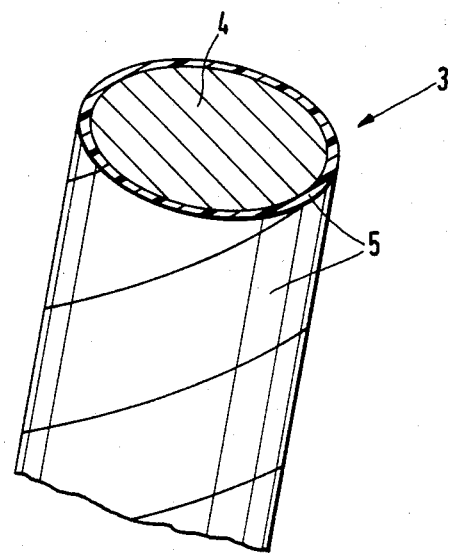
FIG. 2 is a perspective, cross-sectional view of a marker according to the present invention.

FIG. 2 shows a perspective, cross-sectional view of the marker 3 of the invention, including the support element 4 and the plastic tape 5 wound around the support element 4 in spirally overlapping manner.

What is claimed is:

1. A wire rope having a durable marker, comprising: a rope core comprised of a first plurality of strands; a second plurality of strands twisted together around said rope core; and a durable marker comprising a synthetic resin tape which carries marking information and which has a width of from about 2 to 6 mm and a thickness of from about 10 to 100 μm, said tape being wound in a spirally overlapping manner around a support element and being worked into the strands of the wire rope in the direction of the longitudinal axis of said wire rope.

2. A wire rope as claimed in claim 1, wherein the strands of the rope core are comprised of metal.

3. A wire rope as claimed in claim 1, wherein said tape comprises a stretch-oriented polyester film carrying an impression which has an abrasion and shear strength of more than about 0.5 N/15 mm strip width.

4. A wire rope as claimed in claim 1, wherein the support element comprises a glass fiber or a synthetic resin or metal wire having a diameter of from about 100 to 200 μm and a minimum tear strength of about 400 N/mm$^2$.

5. A wire rope as claimed in claim 1, wherein said tape is wound around a support element in spirally overlapping manner and is located between individual bundles of strands so as to be worked into the wire rope at the same twisting angle as the strands.

6. A wire rope as claimed in claim 1, wherein the tensile strength of said rope core accounts for about 60% to about 75% of the tensile strength of said wire rope.

7. A wire rope as claimed in claim 1, wherein said strands of said first and second pluralities, respectively, are each comprised of wires twisted together, the wires comprising said strands of said first plurality having a higher tensile strength and a lower flexibility than the wires comprising said strands of said second plurality.

8. A wire rope as claimed in claim 7, wherein said wires comprising said strands of said first plurality are steel wires.

* * * * *

UNITED STATES PATENT AND TRADEMARK OFFICE
CERTIFICATE OF CORRECTION

PATENT NO. : 4,498,282

DATED : February 12, 1985

INVENTOR(S) : Reinhard GRAETZ and Julius Wolfgang KORNELI

It is certified that error appears in the above—identified patent and that said Letters Patent is hereby corrected as shown below:

On the title page;

[75] Inventor: Reinhard Graetz, Wiesbaden, Fed. Rep. of Germany
Julius Wolfgang Korneli, deceased, late of Wiesbaden, Fed. Rep. of Germany, by Christa Franke Korneli, Michaela Stephanie Korneli, Matthias Wilhelm Korneli and Sebastian Korneli, his heirs Signed and Sealed this Twentieth Day of August 1985

[SEAL]

Attest:

DONALD J. QUIGG

Attesting Officer     Acting Commissioner of Patents and Trademarks